US010428751B2

(12) United States Patent
Uhrich et al.

(10) Patent No.: US 10,428,751 B2
(45) Date of Patent: Oct. 1, 2019

(54) METHOD AND SYSTEM FOR CHARACTERIZING A PORT FUEL INJECTOR

(71) Applicant: Ford Global Technologies, LLC, Dearborn, MI (US)

(72) Inventors: Michael James Uhrich, West Bloomfield, MI (US); Joseph Norman Ulrey, Dearborn, MI (US); Ross Dykstra Pursifull, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 190 days.

(21) Appl. No.: 15/492,936

(22) Filed: Apr. 20, 2017

(65) Prior Publication Data

US 2018/0306134 A1    Oct. 25, 2018

(51) Int. Cl.
| | | |
|---|---|---|
| *F02P 9/00* | (2006.01) | |
| *F02D 41/00* | (2006.01) | |
| *F02D 41/02* | (2006.01) | |
| *F01N 3/10* | (2006.01) | |
| *F01N 9/00* | (2006.01) | |
| *F01N 11/00* | (2006.01) | |
| *F02D 41/38* | (2006.01) | |
| *F02D 41/30* | (2006.01) | |
| *F02D 41/24* | (2006.01) | |
| *F02D 41/12* | (2006.01) | |

(52) U.S. Cl.
CPC ........ *F02D 41/0087* (2013.01); *F01N 3/101* (2013.01); *F01N 9/00* (2013.01); *F01N 11/00* (2013.01); *F02D 41/2467* (2013.01); *F02D 41/3094* (2013.01); *F02D 41/3845* (2013.01); *F02P 9/002* (2013.01); *F01N 2560/025* (2013.01); *F01N 2900/1624* (2013.01); *F02D 41/0295* (2013.01); *F02D 41/123* (2013.01); *F02D 41/126* (2013.01); *F02D 2041/3881* (2013.01); *F02D 2200/0402* (2013.01); *F02D 2200/0602* (2013.01); *F02D 2200/0814* (2013.01)

(58) Field of Classification Search
CPC .. F02P 9/002; F01N 3/101; F01N 9/00; F01N 11/00; F01N 2560/025; F01N 2900/1624; F02D 41/0087; F02D 41/2467; F02D 41/3845; F02D 41/3094; F02D 41/0295; F02D 41/123; F02D 41/126; F02D 2041/3881; F02D 2200/0402; F02D 2200/0602; F02D 2200/0814
USPC .................................. 60/274, 285, 286, 295
See application file for complete search history.

(56) References Cited

U.S. PATENT DOCUMENTS

| | | | |
|---|---|---|---|
| 7,717,088 B2 | 5/2010 | Thomas | |
| 8,113,178 B2 * | 2/2012 | Park ................... | F02D 41/3863 123/467 |
| 9,169,789 B2 * | 10/2015 | Cowgill ............... | F02D 19/024 |

(Continued)

*Primary Examiner* — Audrey K Bradley
*Assistant Examiner* — Dapinder Singh
(74) *Attorney, Agent, or Firm* — Geoffrey Brumbaugh; McCoy Russell LLP

(57) ABSTRACT

Systems and methods for operating an engine that includes one or more fuel injectors are described. The systems and methods may characterize fuel injector operation during a time when injecting fuel may be useful to maintain balance of a catalyst to reduce engine emissions. Further, large or small amounts of fuel may be injected without affecting engine combustion.

16 Claims, 9 Drawing Sheets

(56) References Cited

U.S. PATENT DOCUMENTS

| | | | |
|---|---|---|---|
| 9,267,460 B2 * | 2/2016 | Carey | F02D 41/22 |
| 9,334,824 B2 | 5/2016 | Pursifull et al. | |
| 9,470,167 B2 * | 10/2016 | Carey | F02D 41/22 |
| 2016/0084189 A1 | 3/2016 | Pursifull | |

* cited by examiner

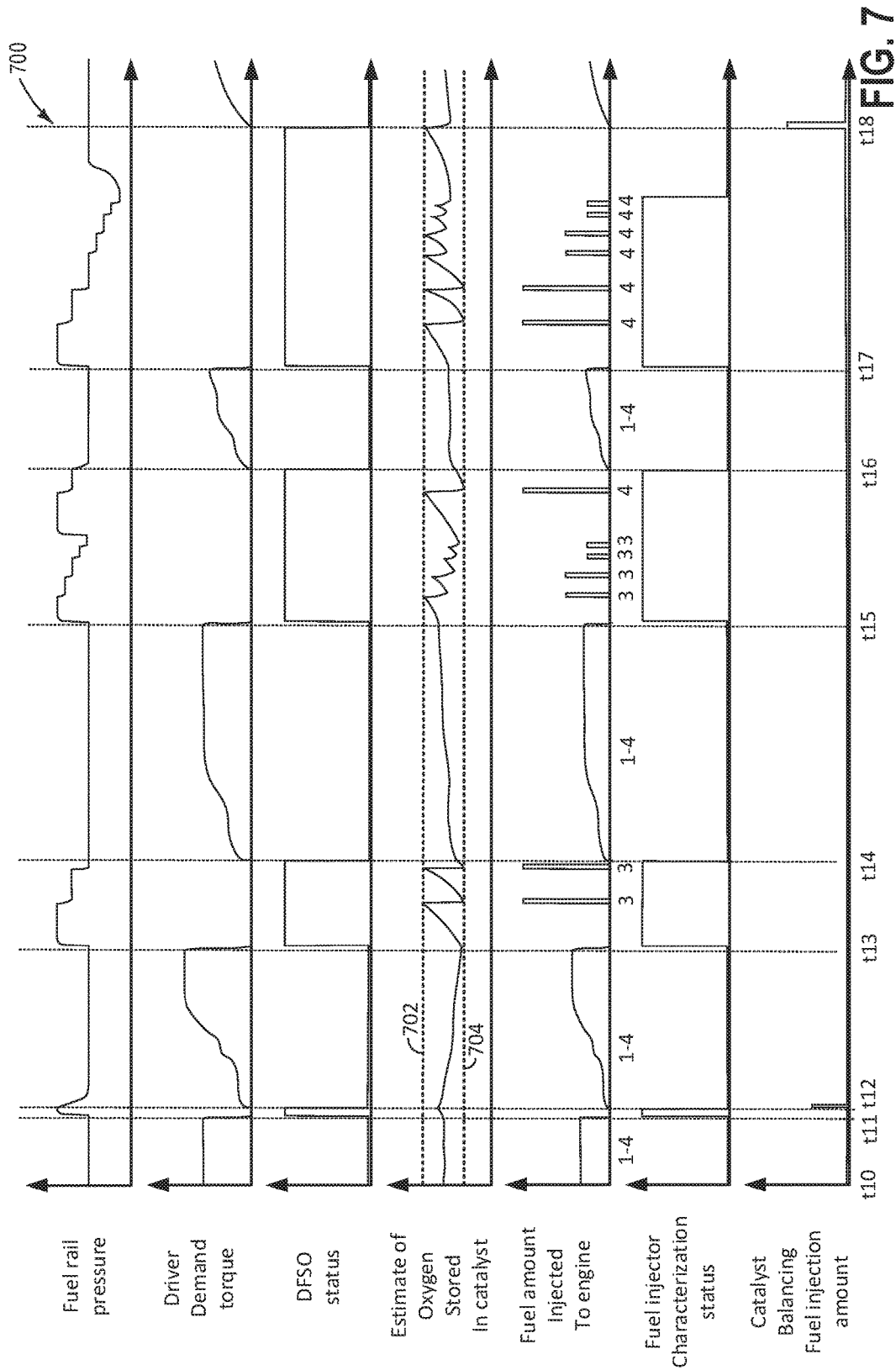

METHOD AND SYSTEM FOR CHARACTERIZING A PORT FUEL INJECTOR

TECHNICAL FIELD

The present application relates to diagnosing fuel injector variability in an engine configured with at least one fuel injector.

BACKGROUND AND SUMMARY

Operation and performance of a fuel injector may change over a life time of a fuel injector. Further, one fuel injector may operate unlike a different but same type of fuel injector due to piece-to-piece variability. Even though one fuel injector may operate slightly different from other fuel injectors, it may be possible to operate other fuel injectors in a way that allows each fuel injector to deliver a desired amount of fuel. One way to characterize operation of a fuel injector is to raise pressure in a fuel rail, deactivate a fuel pump, inject fuel while monitoring pressure in the fuel rail, and combust the fuel. A pressure drop in the fuel rail may be correlated to an amount of fuel injected by the fuel injector and a characterization of fuel flow and injector opening time may be adjusted responsive to the fuel pressure drop. While such a method provides for active fuel injector characterization, it allows fuel injectors to be re-characterized only for fuel injector operating regions that are activated when the re-characterization is performed so that engine emissions and performance do not degrade. For example, if the engine is operating at 0.5 load and fuel flow is X gram per intake stroke to operate the engine at stoichiometric combustion, only fuel injector operation for 0.5 load and stoichiometric combustion may be re-characterized while operating the engine at 0.5 load. As a result, it may take a long time to fully characterize a fuel injector. Further, the engine may have to operate without its fuel injectors being re-characterized for a period of time, which may result in engine air-fuel ratio errors.

The inventors herein have recognized the above-mentioned issues and have developed a method for operating an engine, comprising: increasing pressure of a fuel rail to a threshold pressure and deactivating a cylinder of the engine in response to entering deceleration fuel shut-off; deactivating a fuel pump in response to pressure in the fuel rail being at the threshold pressure; injecting fuel to the deactivated cylinder; correlating pressure drop in the fuel rail to injector operation; and operating a fuel injector responsive to the correlation.

By characterizing operation of a fuel injector during deceleration fuel shut-off (DFSO), it may be possible to re-characterize fuel injector operation over a wide range of fuel injection amounts so that fuel injector operation may be corrected without having to first operate the engine at conditions where fuel injector operation has not been characterized. In addition, injecting fuel while engine cylinders are deactivated in response to entering a deceleration fuel shut-off mode may act to keep constituents in a catalyst coupled to the engine balanced so that exhaust gases may be converted efficiently.

The present description may provide several advantages. In particular, the approach may improve fuel injector characterization by allowing fuel injectors to be characterized for fuel injection amounts that are not based on a present engine air flow rate. In addition, the method allows for adjusting an engine air flow rate while the engine is in a deceleration fuel shut-off mode so that fuel injectors may be characterized sooner after entering deceleration fuel shut-off. Further, the approach adjusts fuel injected during deceleration fuel shut-off with oxygen stored in a catalyst so that the possibility of hydrocarbons breaking through the catalyst may be reduced while fuel injectors are being characterized. Further still, since fuel injector characterization is performed during DFSO, pressure noise do to other fuel injectors injecting fuel may be eliminated.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 7 shows plots of a method to characterize operation of fuel injectors according to the methods of FIGS. 3-5.

DETAILED DESCRIPTION

Figure 1:
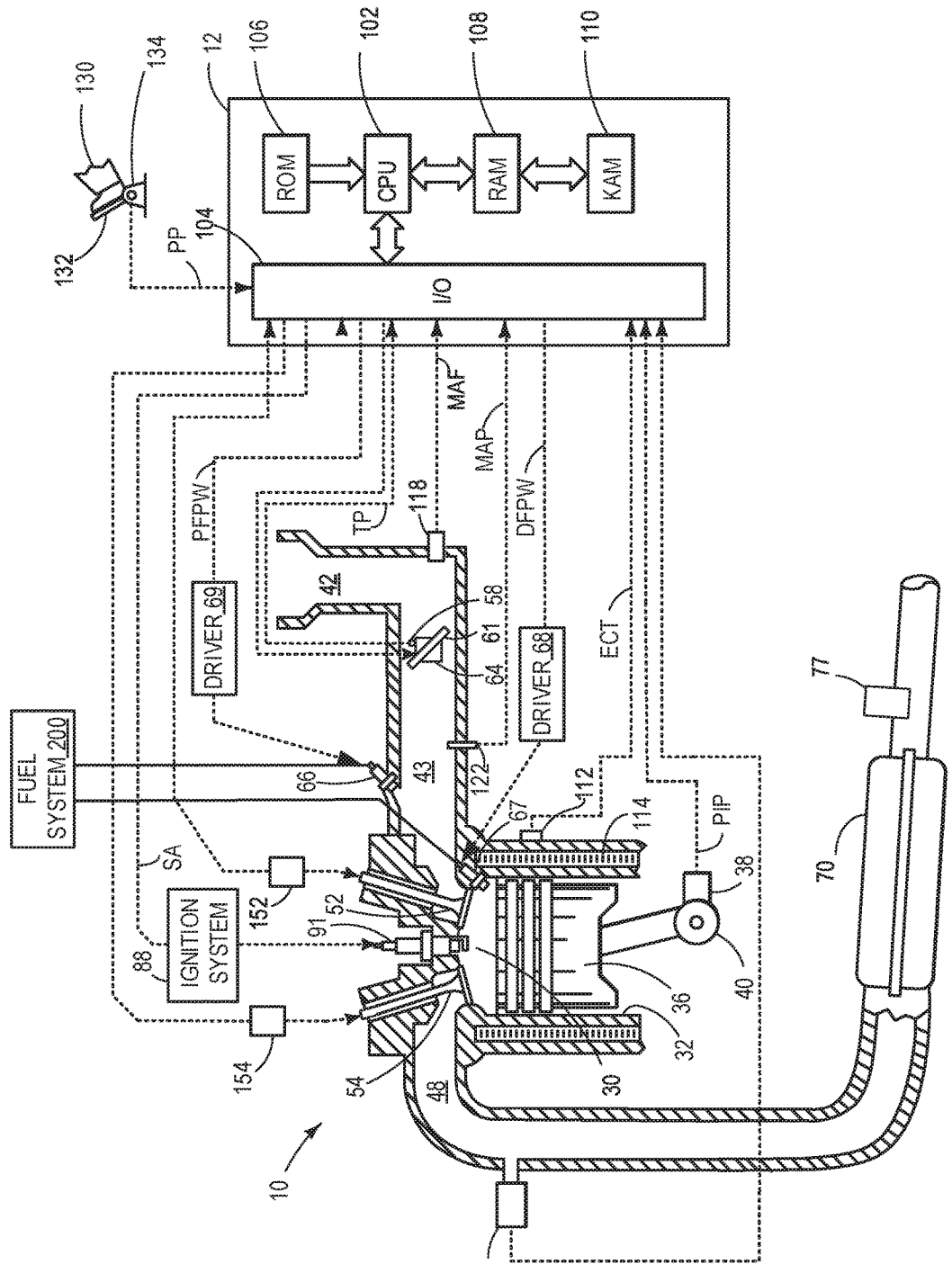
FIG. 1 portrays a schematic diagram of an engine.
Figure 2:
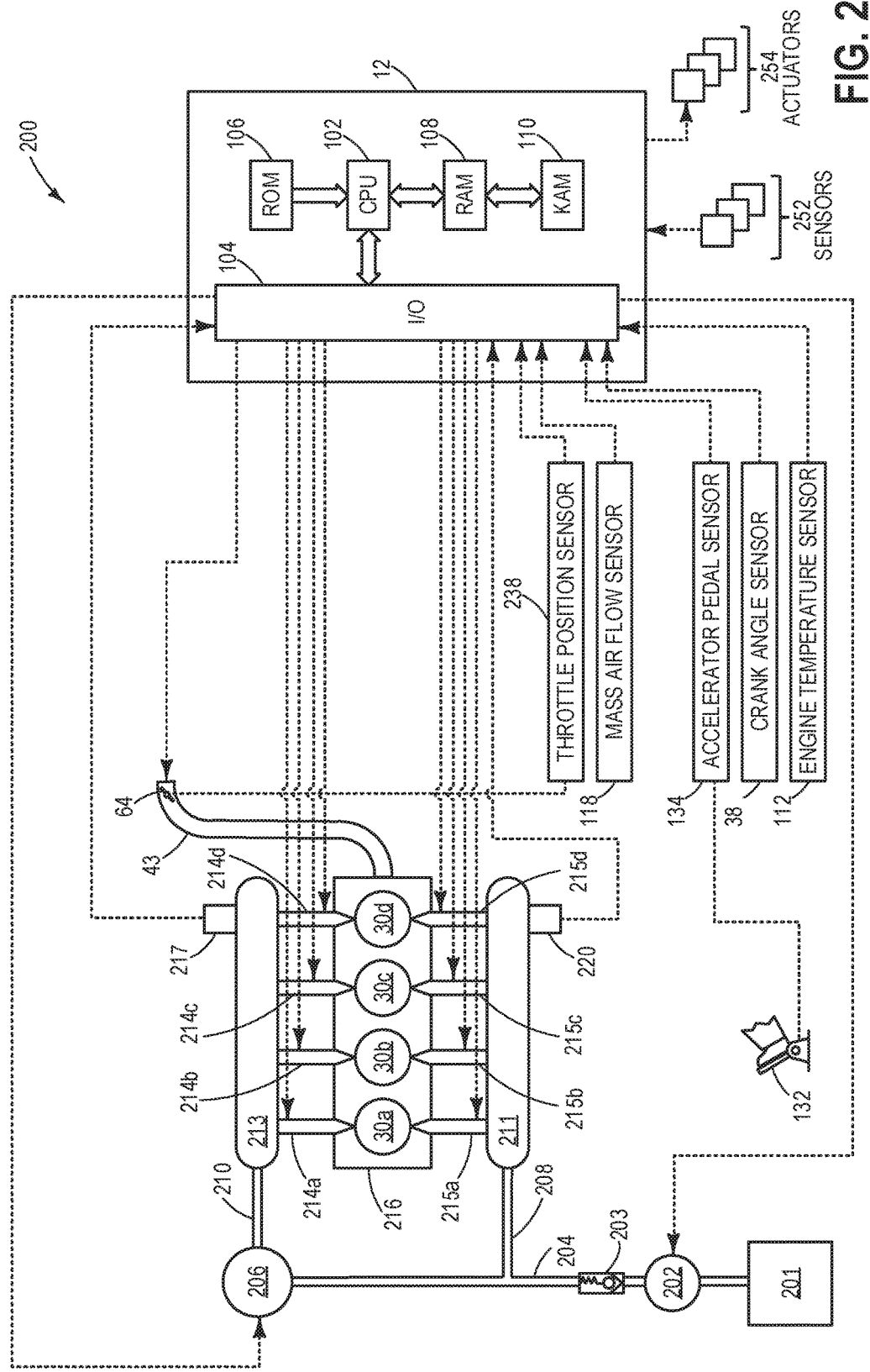
FIG. 2 depicts a schematic diagram of a dual injector, single fuel system coupled to the engine of FIG. 1.

The following description relates to a method for characterizing fuel in a fuel system that includes a single fuel injector or dual injectors for a single engine cylinder, such as the system of FIGS. 1-2 which includes first and second fuel rails and first and second fuel pumps as shown in FIG. 2. An example engine system with two fuel injectors per cylinder, including one port injector and one direct injector is shown at FIGS. 1-2. A controller may be configured to perform control routines to confirm the need for an injector characterization, characterize fuel injectors while an engine is in a deceleration fuel shut-off mode and correlate a measured fuel rail pressure drop to injector operation, such as shown in the example routines of FIGS. 3-5 respectively. After sufficiently pressurizing at least one fuel rail, a single cylinder may receive injected fuel causing a fuel rail pressure drop as shown at FIGS. 6A and 6B. The fuel injection may occur during deceleration fuel shut-off as shown in FIG. 7 to update the fuel injector characterization map shown in FIG. 8.

FIG. 1 shows a schematic depiction of a spark ignition internal combustion engine 10 with a dual injector system, where engine 10 has both direct and port fuel injection.

Alternatively, engine 10 may include only port fuel injectors or only direct fuel injectors. Engine 10 comprises a plurality of cylinders of which one cylinder 30 (also known as combustion chamber 30) is shown in FIG. 1. Cylinder 30 of engine 10 is shown including combustion chamber walls 32 with piston 36 positioned therein and connected to crankshaft 40. A starter motor (not shown) may be coupled to crankshaft 40 via a flywheel (not shown), or alternatively, direct engine starting may be used.

Combustion chamber 30 is shown communicating with intake manifold 43 and exhaust manifold 48 via intake valve 52 and exhaust valve 54, respectively. In addition, intake manifold 43 is shown with throttle 64 which adjusts a position of throttle plate 61 to control airflow from intake passage 42.

Intake valve 52 may be operated by controller 12 via actuator 152. Similarly, exhaust valve 54 may be activated by controller 12 via actuator 154. During some conditions, controller 12 may vary the signals provided to actuators 152 and 154 to control the opening and closing of the respective intake and exhaust valves. The position of intake valve 52 and exhaust valve 54 may be determined by respective valve position sensors (not shown). The valve actuators may be of the electric valve actuation type or cam actuation type, or a combination thereof. The intake and exhaust valve timing may be controlled concurrently or any of a possibility of variable intake cam timing, variable exhaust cam timing, dual independent variable cam timing or fixed cam timing may be used. Each cam actuation system may include one or more cams and may utilize one or more of cam profile switching (CPS), variable cam timing (VCT), variable valve timing (VVT) and/or variable valve lift (VVL) systems that may be operated by controller 12 to vary valve operation. For example, cylinder 30 may alternatively include an intake valve controlled via electric valve actuation and an exhaust valve controlled via cam actuation including CPS and/or VCT. In other examples, the intake and exhaust valves may be controlled by a common valve actuator or actuation system, or a variable valve timing actuator or actuation system.

In another example, four valves per cylinder may be used. In still another example, two intake valves and one exhaust valve per cylinder may be used.

Combustion chamber 30 can have a compression ratio, which is the ratio of volumes when piston 36 is at bottom center to top center. In one example, the compression ratio may be approximately 9:1. However, in some examples where different fuels are used, the compression ratio may be increased. For example, it may be between 10:1 and 11:1 or 11:1 and 12:1, or greater.

In some examples, each cylinder of engine 10 may be configured with one or more fuel injectors for providing fuel thereto. As shown in FIG. 1, cylinder 30 includes two fuel injectors, 66 and 67. Fuel injector 67 is shown directly coupled to combustion chamber 30 for delivering injected fuel directly therein in proportion to the pulse width of signal DFPW received from controller 12 via electronic driver 68. In this manner, direct fuel injector 67 provides what is known as direct injection (hereafter referred to as "DI") of fuel into combustion chamber 30. While FIG. 1 shows injector 67 as a side injector, it may also be located overhead of the piston, such as near the position of spark plug 91. Such a position may improve mixing and combustion due to the lower volatility of some alcohol based fuels. Alternatively, the injector may be located overhead and near the intake valve to improve mixing.

Fuel injector 66 is shown arranged in intake manifold 43 in a configuration that provides what is known as port injection of fuel (hereafter referred to as "PFI") into the intake port upstream of cylinder 30 rather than directly into cylinder 30. Port fuel injector 66 delivers injected fuel in proportion to the pulse width of signal PFPW received from controller 12 via electronic driver 69.

Fuel may be delivered to fuel injectors 66 and 67 by a high pressure fuel system 200 including a fuel tank, fuel pumps, and fuel rails (elaborated at FIG. 2). Further, as shown in FIG. 2, the fuel tank and rails may each have a pressure transducer providing a signal to controller 12.

Exhaust gases flow through exhaust manifold 48 into emission control device 70 which can include multiple catalyst bricks, in one example. In another example, multiple emission control devices, each with multiple bricks, can be used. Emission control device 70 can be a three-way type catalyst with ceria to promote oxygen storage in one example.

Exhaust gas sensor 76 is shown coupled to exhaust manifold 48 upstream of emission control device 70 (where sensor 76 can correspond to a variety of different sensors). For example, sensor 76 may be any of many known sensors for providing an indication of exhaust gas air/fuel ratio such as a linear oxygen sensor, a UEGO, a two-state oxygen sensor, an EGO, a HEGO, or an HC or CO sensor. In this particular example, sensor 76 is a UEGO oxygen sensor that provides a signal to controller 12. Similarly, exhaust gas sensor 77 is positioned downstream of catalyst 70 in a direction of exhaust gas flow. Exhaust gas sensor 77 be any of many known sensors for providing an indication of exhaust gas air/fuel ratio such as a linear oxygen sensor, a UEGO, a two-state oxygen sensor, an EGO, a HEGO, or an HC or CO sensor. In this particular example, sensor 77 is an EGO oxygen sensor that provides a two state signal to controller 12. A high voltage state output from the EGO indicates exhaust gases are rich of stoichiometry and a low voltage state output from the EGO indicates exhaust gases are lean of stoichiometry. Output of UEGO 76 and EGO 77 may be used to adjust engine air-fuel ratio and estimate oxygen stored in catalyst 70.

Distributorless ignition system 88 provides ignition spark to combustion chamber 30 via spark plug 91 in response to spark advance signal SA from controller 12.

Controller 12 may cause combustion chamber 30 to operate in a variety of combustion modes, including a homogeneous air/fuel mode and a stratified air/fuel mode by controlling injection timing, injection amounts, spray patterns, etc. Further, combined stratified and homogenous mixtures may be formed in the chamber. In one example, stratified layers may be formed by operating injector 66 during a compression stroke. In another example, a homogenous mixture may be formed by operating one or both of injectors 66 and 67 during an intake stroke (which may be open valve injection). In yet another example, a homogenous mixture may be formed by operating one or both of injectors 66 and 67 before an intake stroke (which may be closed valve injection). In still other examples, multiple injections from one or both of injectors 66 and 67 may be used during one or more strokes (e.g., intake, compression, exhaust, etc.). Even further examples may be where different injection timings and mixture formations are used under different conditions, as described below.

Controller 12 can control the amount of fuel delivered by fuel injectors 66 and 67 so that the homogeneous, stratified, or combined homogenous/stratified air/fuel mixture in chamber 30 can be selected to be at stoichiometry, a value rich of stoichiometry, or a value lean of stoichiometry.

Controller 12 is shown in FIG. 1 as a conventional microcomputer including: microprocessor unit 102, input/output ports 104, read-only (e.g., non-transitory) memory 106, random access memory 108, keep alive memory 110, and a conventional data bus. Controller 12 is shown receiving various signals from sensors coupled to engine 10, in addition to those signals previously discussed, including measurement of inducted mass air flow (MAF) from mass air flow sensor 118; engine coolant temperature (ECT) from temperature sensor 112 coupled to cooling sleeve 114; a profile ignition pickup signal (PIP) from Hall effect sensor 38 coupled to crankshaft 40; and throttle position TP from throttle position sensor 58 and an absolute Manifold Pressure Signal MAP from sensor 122. Engine speed signal RPM is generated by controller 12 from signal PIP in a conventional manner and manifold pressure signal MAP from a manifold pressure sensor provides an indication of vacuum, or pressure, in the intake manifold. During stoichiometric operation, this sensor can give an indication of engine load. Further, this sensor, along with engine speed, can provide an estimate of charge (including air) inducted into the cylinder. In one example, sensor 38, which is also used as an engine speed sensor, produces a predetermined number of equally spaced pulses every revolution of the crankshaft.

As described above, FIG. 1 merely shows one cylinder of a multi-cylinder engine, and that each cylinder has its own set of intake/exhaust valves, fuel injectors, spark plugs, etc. Also, in the example examples described herein, the engine may be coupled to a starter motor (not shown) for starting the engine. The starter motor may be powered when the driver turns a key in the ignition switch on the steering column, for example. The starter is disengaged after engine start, for example, by engine 10 reaching a predetermined speed after a predetermined time. Further, in the disclosed examples, an exhaust gas recirculation (EGR) system may be used to route a desired portion of exhaust gas from exhaust manifold 48 to intake manifold 43 via an EGR valve (not shown). Alternatively, a portion of combustion gases may be retained in the combustion chambers by controlling exhaust valve timing.

FIG. 2 illustrates a dual injector, single fuel system 200 with a high pressure and a low pressure fuel rail system which may be the fuel system coupled to engine 10 in FIG. 1, for example. Fuel system 200 may include fuel tank 201, low pressure or lift pump 202 that supplies fuel from fuel tank 201 to high pressure fuel pump 206 via low pressure passage 204. Lift pump 202 also supplies fuel at a lower pressure to low pressure fuel rail 211 via low pressure passage 208. Thus, low pressure fuel rail 211 is coupled exclusively to lift pump 202. Fuel rail 211 supplies fuel to port injectors 66a, 66b, 66c and 66d. High pressure fuel pump 206 supplies pressurized fuel to high pressure fuel rail 213 via high pressure passage 210. Thus, high pressure fuel rail 213 is coupled to each of a high pressure pump (206) and a lift pump (202).

High pressure fuel rail 213 supplies pressurized fuel to fuel injectors 67a, 67b, 67c, and 67d. The fuel rail pressure in fuel rails 211 and 213 may be monitored by pressure sensors 220 and 217 respectively. Lift pump 202 may be, in one example, an electronic return-less pump system which may be operated intermittently in a pulse mode. In other examples, un-injected fuel may be returned to fuel tanks 201a and 201b via respective fuel return passages (not shown). The engine block 216 may be coupled to intake manifold 43 with an intake air throttle 64.

Lift pump 202 may be equipped with a check valve 203 so that the low pressure passages 204 and 208 (or alternate compliant element) hold pressure while lift pump 202 has its input energy reduced to a point where it ceases to produce flow past the check valve 203.

Direct fuel injectors 67a-d and port fuel injectors 66a-d inject fuel, respectively, into engine cylinders 30a, 30b, 30c, and 30d located in an engine block 216. Each cylinder, thus, can receive fuel from two injectors where the two injectors are placed in different locations. For example, as discussed earlier in FIG. 1, one injector may be configured as a direct injector coupled so as to fuel directly into a combustion chamber while the other injector is configured as a port injector coupled to the intake manifold and delivers fuel into the intake port upstream of the intake valve. Thus, cylinder 30a receives fuel from port injector 66a and direct injector 67a while cylinder 30b receives fuel from port injector 66b and direct injector 67b.

The system may further include a control unit 12. Control unit 12 may be an engine control unit, powertrain control unit, control system, a separate unit, or combinations of various control units. The control unit 12 is shown in FIG. 2 as a microcomputer, including an input/output (I/O) port 104, a central processing unit (CPU) 102, an electronic storage medium for executable programs and calibration values shown as read only memory (ROM) chip 106 in this particular example, random access memory (RAM) 108, keep alive memory (KAM) 110, and a data bus.

As discussed with regard to FIG. 1, control unit 12 may be further coupled to various other sensors 252 and various actuators 254 (e.g., fuel injection actuator, spark ignition actuator, throttle valve actuator, etc.) for sensing and controlling vehicle operating conditions. For example, the control unit 12 may receive fuel pressure signals from fuel pressure sensors 220 and 217 coupled to fuel rails 211 and 213 respectively. Fuel rails 211 and 213 may also contain one or more temperature sensors for sensing the fuel temperature within the fuel rails. The control unit 12 may also control operations of intake and/or exhaust valves or throttles, engine cooling fan, spark ignition, injector, and fuel pumps 202 and 206 to control engine operating conditions.

The control unit may further receive throttle opening angle signals indicating the intake air throttle position via a throttle position sensor 58, intake air flow signals from a mass air flow sensor 118, accelerator pedal position signal from a pedal 132 via an accelerator pedal position sensor 134, crank angle sensor 38, and engine coolant temperature (ECT) signals from engine temperature sensor 112.

In addition to the signals mentioned above, the control unit 12 may also receive other signals from various other sensors 252. For example, the control unit 12 may receive a manifold pressure signal MAP from a manifold pressure sensor, as shown in FIG. 1.

The control unit 12 may control operations of various vehicular components via various actuators 254. For example, the control unit 12 may control the operation of the fuel injectors 66a-d and 67a-d through respective fuel injector actuators (not shown), and lift pump 202 and high pressure fuel pump 206 through respective fuel pump actuators (not shown).

Fuel pumps 202 and 206 may be controlled by the control unit 12 as shown in FIG. 2. The control unit 12 may regulate the amount or speed of fuel to be fed into fuel rails 211 and 213 by lift pump 202 and high pressure fuel pump 206 through respective fuel pump controls (not shown). The control unit 12 may also completely stop fuel supply to the fuel rails 211 and 213 by shutting down pumps 202 and 206.

Injectors 66a-d and 67a-d may be operatively coupled to and controlled by a control unit, such as control unit 12, as is shown in FIG. 2. An amount of fuel injected from each injector and the injection timing may be determined by the control unit 12 from an engine map stored in the control unit 12 on the basis of engine speed and/or intake throttle angle, or engine load. Each injector may be controlled via an electromagnetic valve coupled to the injector (not shown).

Various modifications or adjustments may be made to the above example systems. For example, the fuel passages (e.g., 204, 208, and 210) may contain one or more filters, pressure sensors, temperature sensors, and/or relief valves. The fuel passages may include one or more fuel cooling systems.

Thus, it is possible for controller 12 to control the fueling of individual cylinders or groups of cylinders. As elaborated below, one port injector of a single cylinder may be sequentially isolated for calibration while the other cylinders continue to receive fuel from other direct injectors, thereby, leaving engine operation significantly unaffected during calibration. Further, any changes in fuel rail pressure (FRP) during calibration may be monitored by pressure sensors coupled to the fuel rails allowing for an evaluation of the injector's performance. Fuel injection via the diagnosed injector may then be adjusted based on the characterization.

The system of FIGS. 1 and 2 provides for a system, comprising: an engine; a catalyst; and a controller including executable instructions stored in non-transitory memory to correlate a pressure drop in a fuel rail to fuel flow through a fuel injector and adjust air flow of the engine based on an amount of oxygen stored in the catalyst in response to entering deceleration fuel shut-off, and instructions to operate the fuel injector responsive to the correlation. The system further comprises additional instructions to exit deceleration fuel shut-off in response to an increasing driver demand torque. The system further comprises additional instructions to inject fuel to a cylinder of the engine via the fuel injector in response to entering deceleration fuel shut-off. The system further comprises additional instructions to estimate oxygen stored in the catalyst during deceleration fuel shut-off.

Figure 3:
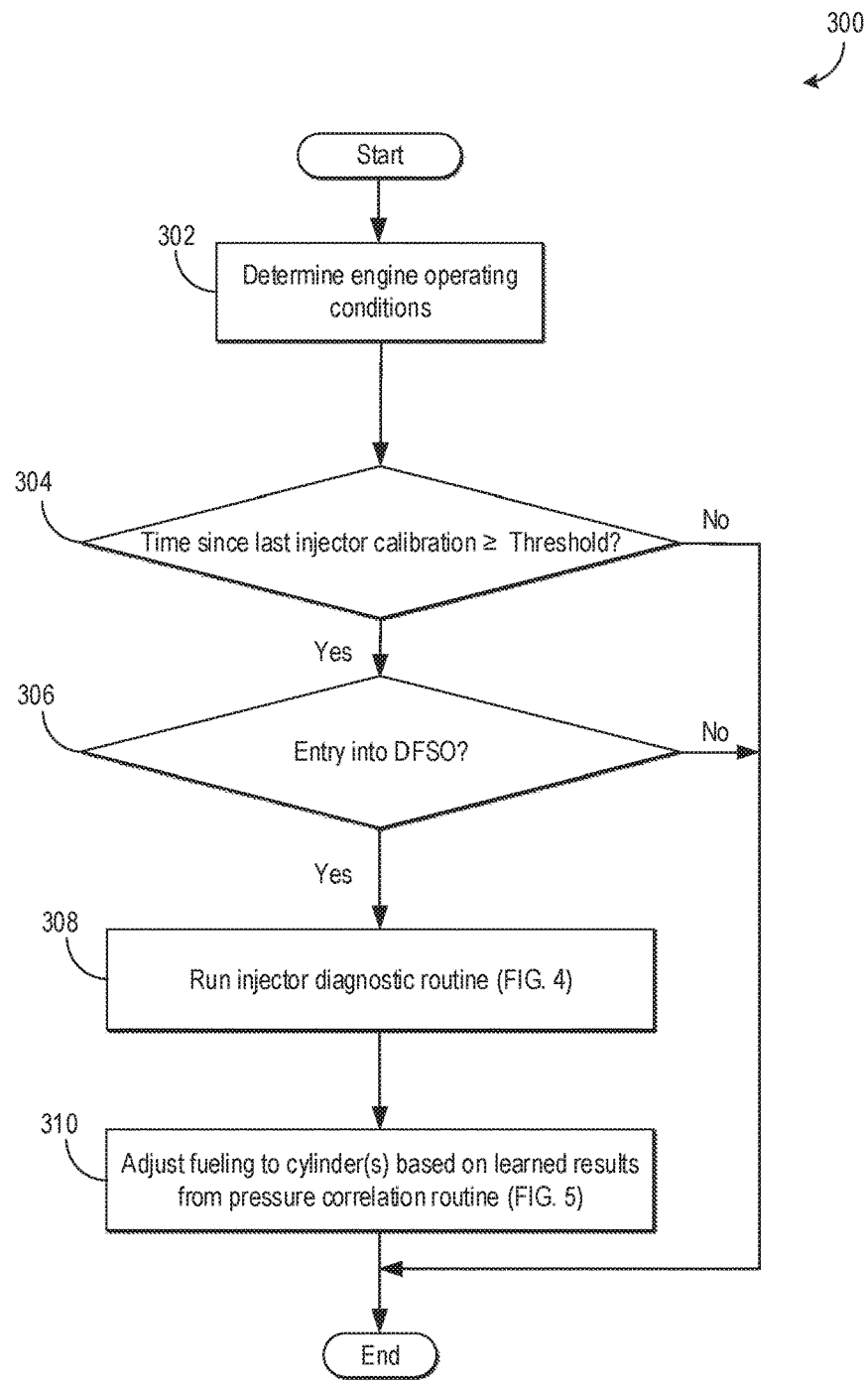
FIG. 3 is an example flowchart illustrating a routine that confirms the need of an injector calibration event and performs it based on selected conditions.
Figure 4A:
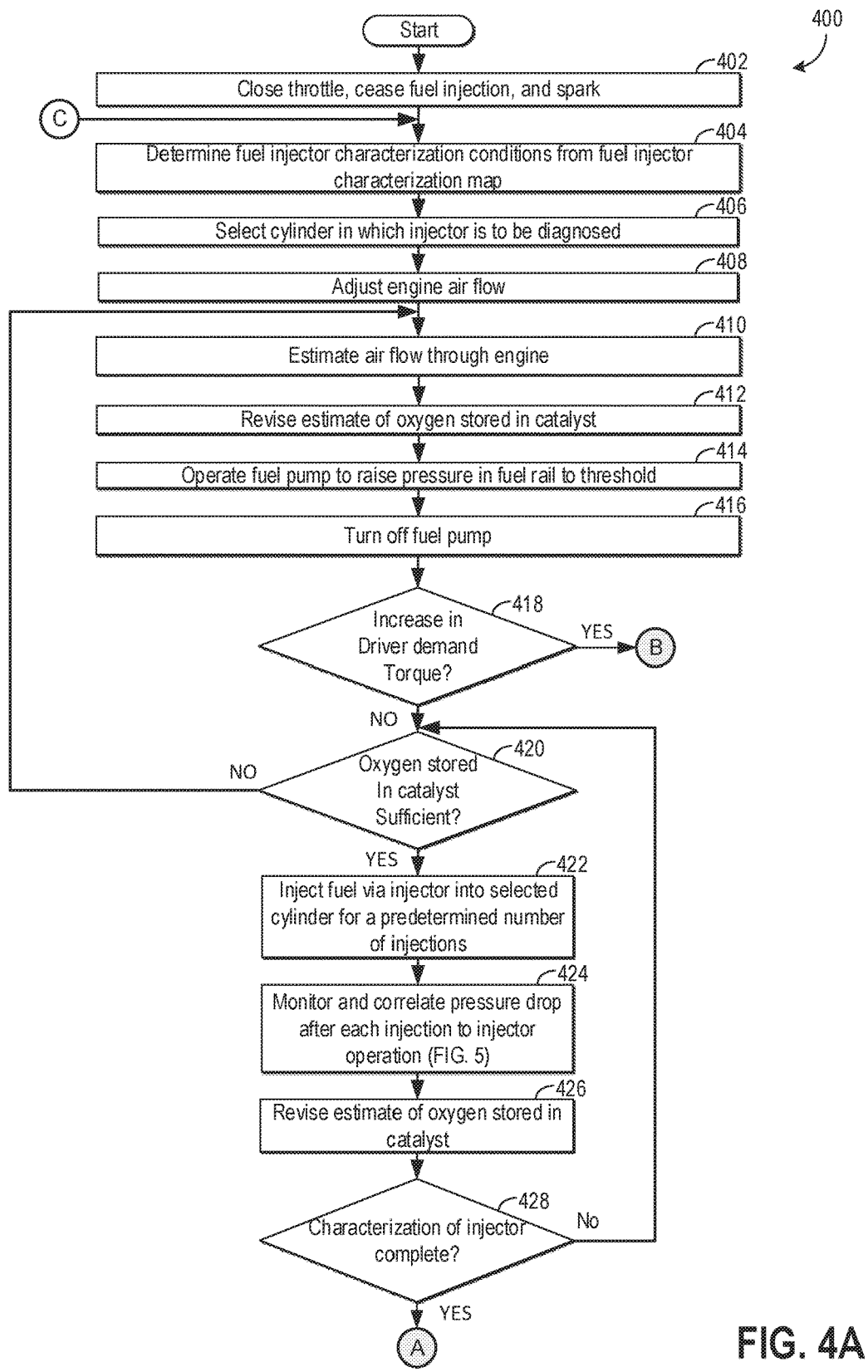
FIGS. 4A and 4B present a flowchart demonstrating an example fuel injector characterization routine.
Figure 4B:
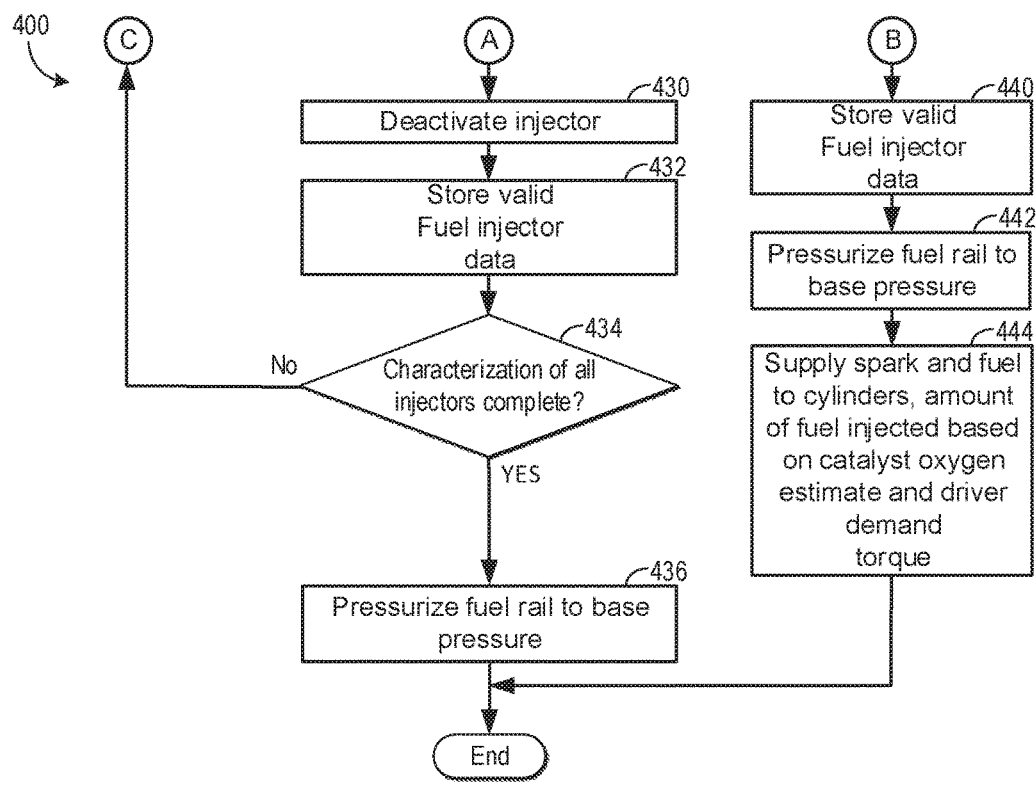
Figure 5:
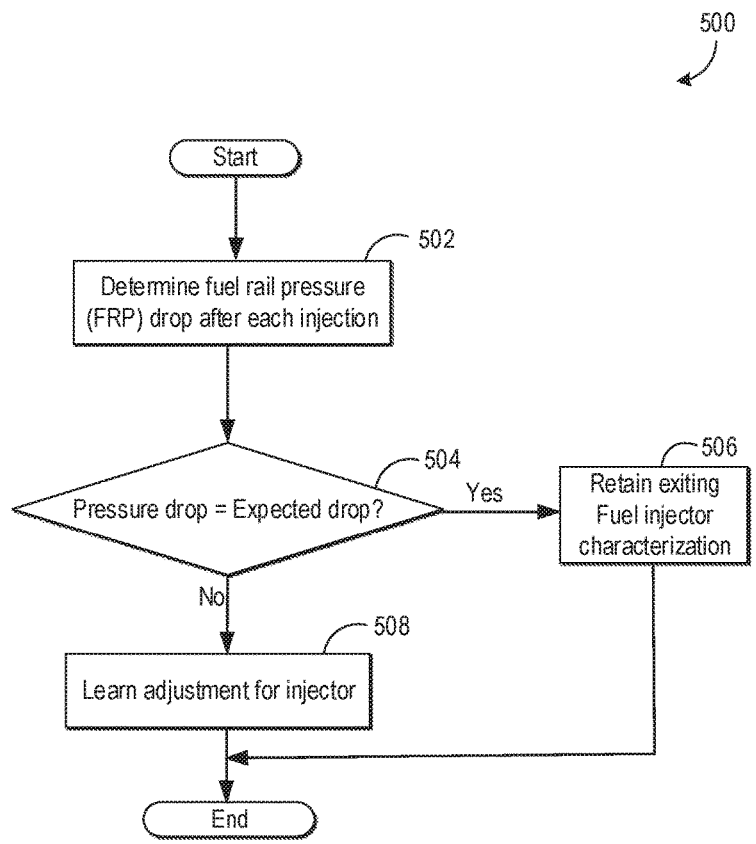
FIG. 5 shows a flowchart depicting an example correlation between fuel pressure drop and injector operation.
Figure 6A:
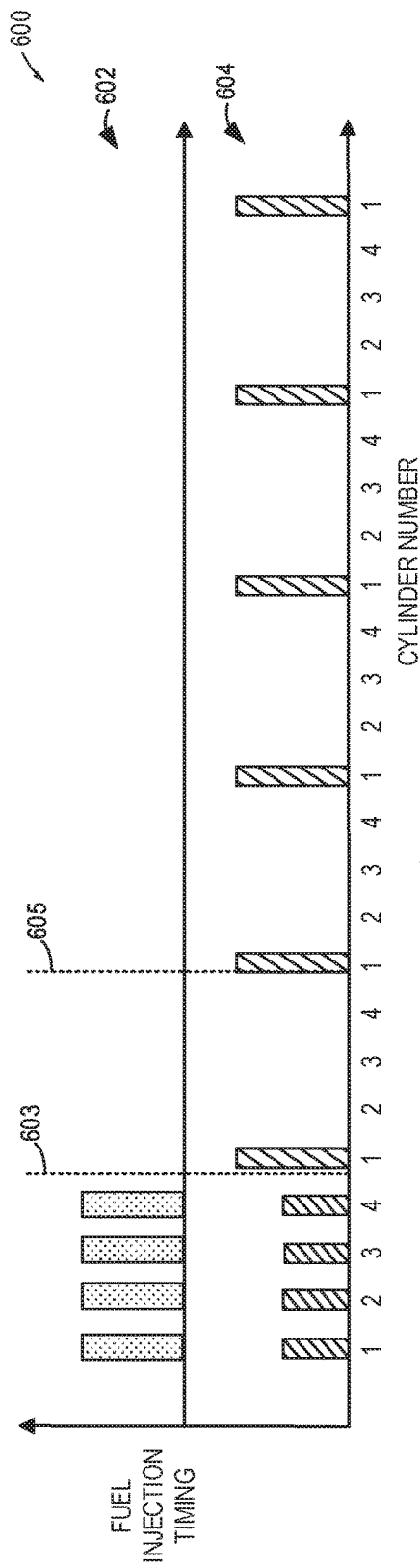
FIGS. 6A and 6B show an example fuel injection timing and fuel rail pressure change during a fuel injector characterization routine, respectively.
Figure 6B:
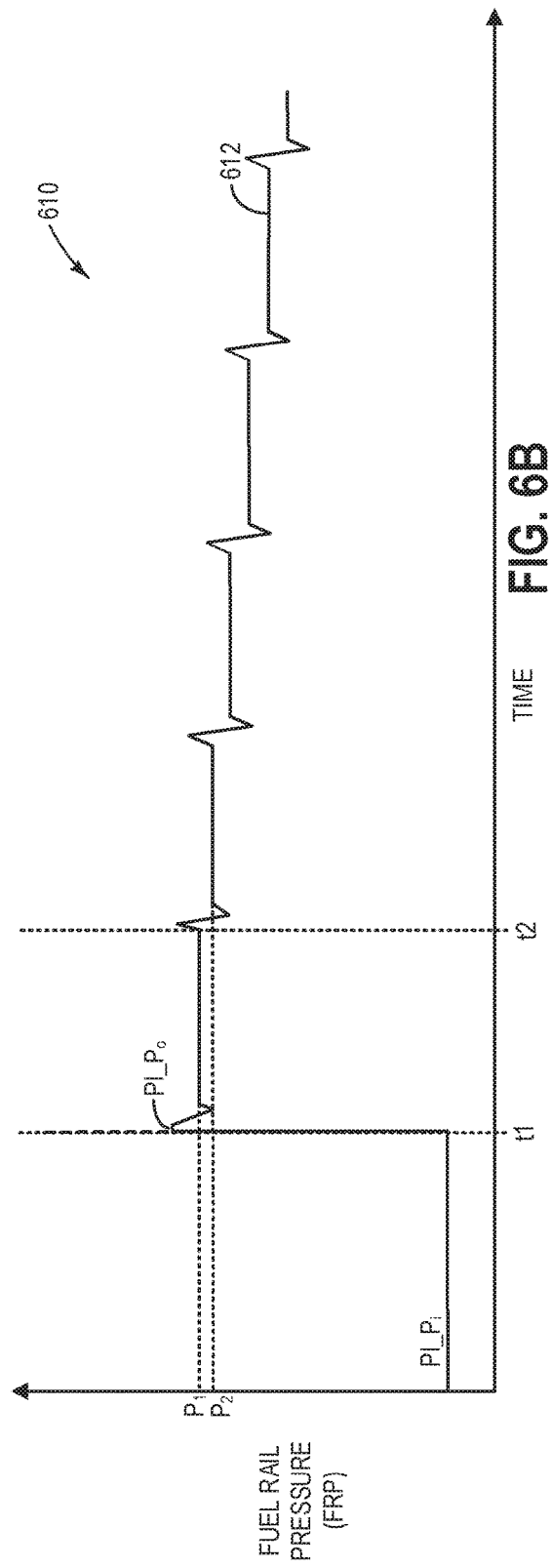

Example routines that may be performed by controller 12 to evaluate injector operation are shown in FIGS. 3-5. Routine 300 in FIG. 3 verifies whether a fuel injector characterization can be performed based on engine operating conditions. Meanwhile, routine 400 in FIGS. 4A and 4B performs a fuel injector characterization while routine 500 in FIG. 5 correlates a measured pressure drop in fuel rail pressure (FRP) at the low pressure fuel rail to fuel injector performance.

At FIG. 3, an example routine 300 determines if an injector characterization routine can be initiated based on existing engine operating conditions. Specifically, routine 300 determines if a characterization routine is desired based on an amount of time since the last injector calibration. The fuel injector characterization may describe an amount of fuel that flows through the fuel injector with respect to an amount of time the fuel injector is open.

At 302, engine operating conditions may be determined. Engine operating conditions may include engine load, engine temperature, engine speed, vehicle speed, etc. For example, a controller may decide to not activate a fuel injector characterization routine if the engine is operating under high loads. Once engine operation conditions are estimated, routine 300 proceeds to 304 where it may be assessed if an amount of time since the last injector characterization is greater than or equal to a predetermined threshold. As examples, injector characterization or calibration may be desired one or more times per drive cycle, every other drive cycle, or after a predetermined distance is driven.

If the time since the last injector calibration is not greater than or equal to the predetermined threshold, routine 300 ends. In contrast, if sufficient time has elapsed, routine 300 proceeds to 306 where method 300 judges if the vehicle and engine are or should be in a deceleration fuel shut-off mode. In one example, the vehicle and engine may enter deceleration fuel shut-off when a driver demand (e.g., an engine torque request provided via a human driver or automated driver) is reduced from a value greater than a first threshold level to a value less than a second threshold value while vehicle speed is greater than a third threshold value, the first threshold value greater than the second threshold value. Further, catalyst temperature may be required to be greater than a threshold temperature to enter deceleration fuel shut-off mode so that catalyst efficiency may be maintained. In deceleration fuel shut-off mode, fuel injection to one or more engine cylinders is ceased and spark delivery to the one or more engine cylinders ceases. If method 300 judges that the vehicle is in or should be in a deceleration fuel shut-off mode, method 300 proceeds to 308. Otherwise, method 300 proceeds to exit.

At 308, an injector characterization routine is carried out, as will be described below with reference to FIGS. 4A and 4B. The injector characterization routine may be repeated multiple times and for each characterization test, an injector error (slope or offset) may be determined. This error may be averaged over the multiple repetitions allowing for higher precision of injector correction. At 310, upon completing the characterization routine, a fuel injection amount via the calibrated injector may be adjusted based upon learned values from the characterization routine, as elaborated at FIG. 5.

Continuing now to FIGS. 4A and 4B, a characterization routine 400 is illustrated for evaluating the performance of port and/or direct fuel injectors in a fuel system. Specifically, the fuel rail pressure in either or both a high pressure and low pressure fuel rail is elevated to a preset level from a base initial non-zero level after the vehicle enters a deceleration fuel shut-off mode, all fuel pumping is then suspended and fuel is injected into a single cylinder via a port injector or a direct injector in order to detect a pressure drop in the low pressure fuel rail or the high pressure fuel rail due to the fuel injection. As such, the engine rotates with one or more cylinders deactivated (e.g., not combusting air and fuel) while the injector being characterized injects fuel to the deactivated cylinder. The amount of fuel injected to the deactivated cylinder may be based on values not recently revised in a fuel injector characterization function or map and an amount of oxygen stored in a catalyst located downstream of the engine. Each fuel injector of the engine system may be sequentially diagnosed. It will be appreciated that the characterization routine may be performed to diagnose a single cylinder at a time (as shown) or a bank of cylinders at a time. Note that if direct fuel injectors are being characterized, only the direct injection fuel pump may be deactivated.

At 402, method 400 substantially (e.g., less than 2% of maximum engine air flows through the throttle) or fully closes the engine intake throttle, ceases fuel injection, and delivery of spark to cylinders that are deactivated responsive to the vehicle entering deceleration fuel shut-off mode. In one example, all engine cylinders are deactivated and the engine crankshaft continues to rotate so that a small flow rate of air is pumped from the engine to the catalyst. Even though the intake throttle is fully closed, a small amount of air may be drawn through the engine and pumped to a catalyst positioned in an exhaust passage coupled to the engine. The air pumped through the engine may disturb a balance of oxygen stored in the catalyst such that after entering deceleration fuel shut-off mode without characterizing fuel injectors, the engine may be operated with a rich air-fuel mixture after exiting deceleration fuel shut-off mode so that oxygen in the catalyst is reduced and so that NOx conversion efficiency of the catalyst may be improved. However, by injecting fuel to the deactivated cylinders as described herein and expelling fuel that has not been combusted to the catalyst, oxygen stored in the catalyst may be returned to a desired level (e.g., fifty percent of the oxygen storage capacity of the catalyst). Further, NOx reduction conversion efficiency of the catalyst may be improved by reducing an amount of oxygen stored in a catalyst from the catalyst's oxygen storage capacity (e.g., a catalyst saturated with oxygen) to a fraction of the catalyst's oxygen storage capacity (e.g., fifty percent of oxygen storage capacity). Method 400 proceeds to 404.

At 404, method 400 determines fuel injector characterization conditions from a fuel injector characterization map stored in non-transitory controller memory. In one example, the fuel injector characterization map describes a fuel injector opening time that provides a desired amount of fuel. The desired amount of fuel may be based on engine speed, driver demand torque, and desired engine air-fuel ratio. Thus, if present engine operating conditions request X gm of fuel delivered to a cylinder for a combustion cycle (e.g., two engine revolutions while the engine is combusting air and fuel), the fuel injector characterization map is indexed or referenced by X gm of fuel and the table outputs an amount of time to open the fuel injector to provide X gm of fuel to the engine cylinder. The fuel injector characterization may include a predetermined actual total number of entries and each of the entries may be updated based on actual fuel injector output to improve open loop fuel injector control. Method 400 tracks which fuel injector characterization map entries have been updated and selects which entry is to be updated. For example, a fuel injector characterization may include entries for X gm fuel/combustion cycle, Y gm fuel/combustion cycle, and Z gm fuel/combustion cycle. If the entry for X gm fuel/combustion cycle has been recently revised according to the method of FIG. 4, then the entry corresponding to Y gm fuel/combustion cycle may be selected to be updated or revised. Thus, entries in the fuel injector characterization map may be sequentially revised or adapted from a first entry in the map to a last entry in the map. In one example, method 400 selects a next entry in the fuel injector characterization map that has not been updated or adapted within a threshold amount of time. By selecting which entry in the fuel injector characterization map that is to be updated, method 400 determines the amount of fuel to be injected to re-characterize the fuel injector for the engine cylinder determined at 406. Method 400 proceeds to 406 after selecting which entry in the fuel injector characterization may is to be revised.

In some circumstances the entries in the fuel injector characterization map may need to be adjusted. For example, a fuel pulse width where fuel just begins to flow from the fuel injector may need to be established. Therefore, a fuel injection pulse width may be increased until a pressure drop is observed in the fuel rail. The fuel injector pulse width where the fuel pressure drop is first observed may be referred to as an offset pulse width. The fuel injector may inject fuel at this fuel pulse width several times to confirm the offset pulse width. In addition, the fuel injector may be commanded to cycle asynchronously every 3 to 5 milliseconds to determine a more exact offset pulse width.

Fuel volume metered by an injector depends on the period fuel which the injector is energized, the voltage applied to the injector to energize it, and the pressure across the injector. Thus, when this characterization is done compensation for these factors is provided by correcting the fuel injector characterization to a nominal voltage and pressure to avoid having to characterize the injector over a map of voltage and pressure as well as the primary consideration of injector energization time.

At 406, method 400 selects a fuel injector of a cylinder for re-characterization (e.g., revising a relationship between amount of fuel injected and time the fuel injector is open). In one example, method 400 selects the cylinder based on engine firing order. In other examples, method 400 selects a cylinder based on cylinder number. For example, if the engine firing order is 1-3-4-2, method 400 may first select cylinder number one for fuel injector characterization. After fuel injectors in cylinder number one are re-characterized, method 400 selects cylinder number three for re-characterizing fuel injectors of cylinder number three, and so on until injectors of all cylinders are re-characterized. Further, if the selected cylinder includes two fuel injectors, the port fuel injector may first be re-characterized and then the direct fuel injector of the selected fuel injector may be re-characterized. Method 400 proceeds to 408.

At 408, method 400 adjusts air flow through the engine. In one example, air flow through the engine is adjusted via opening the throttle and/or adjusting intake and exhaust valve timing. The air flow amount through the engine may be adjusted in response to the value in the fuel injector characterization map that is being adapted or re-characterized (e.g., a desired amount of fuel injected during DFSO). In one example, a table or function holds empirically determined values of engine air flow that correspond to entries in the fuel injector characterization map. The value of the fuel injector characterization map that is being adapted or adjusted is used to reference the table or function and the table or function outputs a desired engine air flow. By adjusting the engine air flow responsive to the entry in the fuel injector characterization map that is being adjusted, it may be possible to shorten the amount of time to re-characterize a fuel injector. For example, if the fuel injector is being re-characterized at an operating condition for injecting a large amount of fuel, the engine air flow rate may be increased so that the catalyst stores a large amount of oxygen in a short amount of time so that the injected fuel may be oxidized with less possibility of hydrocarbons exiting the catalyst without being oxidized (e.g., hydrocarbon breakthrough). Method 400 proceeds to 410 after adjusting the engine air flow.

At 410, method 400 estimates air flow through the engine. The engine air flow may be estimated via output of a mass air flow sensor or via an absolute manifold pressure sensor and engine speed as is known in the art. Method 400 proceeds to 412 after estimating air flow through the engine. The air flow through the engine is equal to air flow to the catalyst after the engine cylinders have been deactivated.

At 412, method 400 estimates an amount of oxygen stored in the catalyst located downstream of the engine in the engine's exhaust path. In one example, the amount of oxygen flowing to the catalyst before entering decoration fuel shut-off may be estimated by the following equation:

$$O_2 = A[(1-\phi)\cdot(1+y/4)]\cdot 32$$

where $O_2$ is the molecular flow rate of oxygen that is available to store in the catalyst or that is available to oxidize hydrocarbons, $\phi$ is the engine air-fuel ratio, y is a variable that varies based on the type of gasoline which is nominally 1.85, and A is the more flow rate of air in the exhaust. The value of A may be based on the following equation:

$$A = \frac{1}{(1+y/4)(MW_{O_2} + MW_{N_2} + 3,76)}$$

where $MW_{O_2}$ is the mole weight of oxidant, which equals 32; $MW_{N_2}$ is the mole weight of nitrogen, which equals 28. A negative value of $O_2$ indicates that oxidant may be absorbed by the catalyst and a positive value of $O_2$ indicates that oxidant may be desorbed by the catalyst. During conditions when combustion is ceased in the engine (e.g., while in DFSO), the mass air flow rate of air through the engine may be converted into a mole flow rate of air, and the mole flow rate of air may be multiplied by the percentage of oxygen in air (e.g., about twenty one percent) to determine the mole flow rate of oxygen to the catalyst. The change in oxidants in the catalyst may be determined via the following equations:

$$\Delta O_2 = C_1 \cdot C_2 \cdot C_3 \cdot C_4 \left[ \begin{array}{c} K_a \cdot 1 - \left(\frac{\text{Stored } O_2}{\text{Max } O_2}\right)^{N_1} \cdot \\ \left(\frac{O_2 \text{ Flow rate}}{\text{Base value}}\right)^{Z_1} \cdot \text{Cat vol} \cdot \Delta T \end{array} \right]_{\text{for oxygen being absorbed}}$$

$$\Delta O_2 = C_1 \cdot C_2 \cdot C_3 \cdot C_4 \left[ \begin{array}{c} K_d \cdot 1 - \left(\frac{\text{Stored } O_2}{\text{Max } O_2}\right)^{N_1} \cdot \\ \left(\frac{O_2 \text{ Flow rate}}{\text{Base value}}\right)^{Z_1} \cdot \text{Cat vol} \cdot \Delta T \end{array} \right]_{\text{for oxygen being desorbed}}$$

where variables $C_1$ is an empirically determined coefficient that varies with catalyst temperature, $C_2$ is an empirically determined coefficient that varies with catalyst degradation, and $C_3$ is an empirically determined coefficient that varies with mass flow rate through the catalyst, $C_4$ is a feedback adjustment value which may be adjusted responsive to oxygen sensor output to correct the catalyst oxygen storage estimate, Ka is a maximum oxidant absorbing rate of the catalyst, Kd is a maximum oxidant desorbing rate, Max $O_2$ is a maximum amount of oxygen the catalyst may store in grams, Stored $O_2$ is the previous amount of oxygen determined stored in the catalyst, $O_2$ Flow rate is the mass flow rate of air through the engine, Base value is the oxygen flow rate where $K_a$ and $K_d$ were determined, Cat vol is the actual total volume of the catalyst. $\Delta T$ is the elapsed time since the last estimation of oxidant stored in the catalyst, N1, N2, Z1, and Z2 are exponents that may be empirically determined and they express the probability of desorption/adsorption. Ka, Kd, and Max $O_2$ may be experimentally determined. The percentage of catalyst oxygen storage capacity used to store oxygen is the amount of oxygen stored in the catalyst divided by the value of Max $O_2$, and the value of Max $O_2$ may be adjusted for catalyst temperature and degradation. Method 400 proceeds to 414 after estimating the amount of oxygen stored in the catalyst and the percentage of catalyst oxygen storage capacity used to store oxygen.

At 414, a high pressure pump coupled to a high pressure fuel rail and direct injectors may be operated to increase pressure within the high pressure fuel rail above a base pressure (e.g., a pressure based on engine speed and load) to a threshold pressure. Alternatively, a low pressure pump coupled to a low pressure fuel rail and port fuel injectors may be operated to increase pressure within the low pressure fuel rail above a base pressure to a threshold pressure. By raising the pressure in the entire fuel system before a fuel injectors are re-characterized, sufficient fuel may be available for correct metering by the injector and for multiple injection events.

At 416, method 400 shuts off the high pressure pump and the lift or low pressure pump. In this way, a control volume may be provided within the high pressure fuel rail and another control volume of fuel may exist within the low pressure system. For example, referring to FIG. 2, a first control volume of fuel at a higher pressure may be stored in fuel rail 213 and passage 210 whereas a second control volume of fuel may exist within the low pressure system of passages 204 and 208, and fuel rail 211.

At 418, method 400 judges if the driver has increased the driver demand torque (e.g., a torque request made of the engine responsive to accelerator pedal position and vehicle speed). The increased driver demand torque may be the basis for exiting deceleration fuel shut-off mode. Therefore, fuel injector re-characterization may cease in response to an increasing driver demand torque. If method 400 judges that driver demand torque has increased, the answer is yes and method 400 proceeds to 440. Otherwise, the answer is no and method 400 proceeds to 420.

At 420, method 400 judges if the amount of oxygen stored in the catalyst is sufficient to maintain an amount of oxygen stored in the catalyst to be greater than a threshold amount of oxygen immediately after fuel to be injected to the cylinder reaches the catalyst, the answer is yes and method 400 proceeds to 422. Otherwise, the answer is no and method 400 returns to 410.

Stated another way, if injecting the fuel amount determined at 404 from the fuel injector characterization map would cause oxygen stored in the catalyst to be less than a threshold amount immediately after fuel from the injection reaches the catalyst, then the answer is no and there is insufficient oxygen stored in the catalyst to perform the fuel injector re-characterization so that method 400 returns to 410 to allow more oxygen to be stored in the catalyst before injecting fuel. On the other hand, if injecting the fuel amount determined at 404 from the fuel injector characterization map would cause oxygen stored in the catalyst to be greater than a threshold amount immediately after fuel from the injection reaches the catalyst, then the answer is yes and there is sufficient oxygen stored in the catalyst to perform the fuel injector re-characterization.

In one example, method 400 may allow fuel to be injected to the selected engine cylinder when the amount of injected fuel allows greater than 20 percent of the catalyst's oxygen storage capacity to be storing oxygen immediately following the injected fuel reaching the catalyst. For example, if it is desired to maintain oxygen stored in the catalyst above 20 percent of the catalyst's oxygen storage capacity, and if the catalyst has X grams of oxygen storage capacity and it takes 10 percent of the catalyst's oxygen storage capacity to oxidize the amount of fuel to be injected to the cylinder as determined at 404, the fuel may be injected if the amount of oxygen stored in the catalyst exceeds 30 percent of the catalyst's oxygen storage capacity X.

At 422, method 400 injects fuel to the selected cylinder via the selected fuel injector for a predetermined actual total number of fuel injections to the selected cylinder. Thus, after the pumping of fuel is suspended, the selected cylinder may be injected with fuel via only its port injector or only its direct fuel injector at step 422. Fuel may be injected into the single cylinder for a predetermined number of individual injections. This number may depend on the pulse width of the injection. For example, fewer injections may be applied if a larger pulse width of injection is used, while more injections may be applied if a smaller pulse width of injection is used. Alternatively, the number of injections may be adjusted based on the commanded fuel injection volume, the number of injections decreased as the commanded fuel injection volume increases. The engine rotates and expels fuel that is injected to the selected cylinder to the engine exhaust system and catalyst. Since the catalyst is warm and there is sufficient oxygen in the catalyst, the injected fuel may be oxidized in the catalyst to reduce the possibility of hydrocarbon breakthrough. In this way, even though engine cylinders are deactivated, hydrocarbons may be prevented from reaching atmosphere, thereby controlling vehicle emissions.

At 424, method 400 monitors pressure drops within the fuel rail supplying fuel to the injector having a fuel injector characterization map that is being re-characterized. For example, the controller may receive signals from the pressure sensor coupled to the low pressure fuel rail which senses the change in fuel rail pressure (FRP) after each injection. The correlation with injector performance will be described later in reference to FIG. 5.

At 426, method 400 revises the estimate of oxygen stored in the catalyst as described at 412. By revising the estimate of oxygen stored in the catalyst after fuel is injected to the cylinder, the estimate of the amount of oxygen stored in the catalyst can be reduced to adjust for oxygen used to oxidize the injected fuel. Method 400 proceeds to 428 after revising the amount of oxygen stored in the catalyst.

At 428, it may be determined if the injector re-characterization is complete. In one example, a re-characterization may be completed when a satisfactory number of pressure drop readings are obtained and the fuel injector characterization map is updated based on the correlation between the fuel rail pressure drops and the amounts of fuel requested to be injected. If the fuel injector characterization map adjustments are completed for the selected injector, the answer is yes and method 400 proceeds to 430. Otherwise, the answer is no and method 400 returns to 420.

At 430, method 400 deactivates the selected injector so that it no longer injects fuel during the present deceleration fuel shut-off event. Method 400 proceeds to 432.

At 432, method 400 updates or revises values stored in the fuel injector characterization map. The values are updated based on the correlation between the fuel rail pressure drops and the amounts of fuel requested to be injected. For example, if method 400 requested injection of Q grams of fuel for a fuel pulse width of 10 milliseconds and Q+Z grams of fuel were injected when the fuel injector was opened for 10 milliseconds, the fuel injector characterization may adjust the fuel pulse with corresponding to Q grams to 9.5 milliseconds so that the selected fuel injector provides Q grams of fuel when the selected fuel injector is open for 9.5 milliseconds. Method 400 proceeds to 434.

At 434, method 400 it may be determined if re-characterization of all injectors is complete. If each fuel injector of the engine has been re-characterized, the answer is yes and method 400 proceeds to 436. Otherwise, the answer is no and method 400 returns to 404.

At 436, method 400 pressurizes the low pressure fuel rail and the high pressure fuel rails to base values (e.g., values based on engine speed and load). Method 400 proceeds to exit.

At 440, method 400 updates or revises values stored in the fuel injector characterization map for fuel injector characterization map entries that have been determined based on the fuel rail pressure drop and desired amount of fuel injected. However, if fuel was injected and pressure in the fuel rail did not stabilized before a driver demand torque occurred, the fuel injector characterization map entry corresponding to the amount of fuel injected is not updated. Method 400 proceeds to 442.

At 442, method 400 pressurizes the low pressure fuel rail and the high pressure fuel rails to base values (e.g., values based on engine speed and load). Method 400 proceeds to 444.

At 444, method 400 activates cylinders by flowing air to the cylinders, supplying spark to the cylinders, and supplying fuel to the cylinders. The amount of fuel supplied to the cylinders is based on engine speed and load and the amount of oxygen stored in the catalyst at the time the engine and vehicle exit deceleration fuel shut-off. For example, if the amount of oxygen stored in the catalyst is the catalyst's oxygen storage capacity, fuel supplied to the engine is richened by an amount corresponding to the amount of oxygen stored in the catalyst that exceeds a threshold amount. Thus, if the catalyst is storing W grams of oxygen and the desired amount of fuel to be stored in the catalyst is 0.5*W, then the amount of fuel injected to the engine is richened by an amount such that 0.5*W of oxygen in the catalyst is consumed oxidizing the excess fuel injected to the engine. For example, a catalyst may store 1.5 g of O2 at moderate temperature. The air that corresponds to 1.5 g of O2 is 1.5/0.21=7.1 g. The fuel that corresponds to 7.1 g of air is 7.1/14.6=0.5 g fuel. Thus it may require 0.25 g of fuel to re-center a catalyst.

In this way, the amount of oxygen stored in the catalyst may be returned to a desired value when the vehicle and engine exit deceleration fuel shut-off mode. Further, the fuel injectors are operated responsive to the fuel injector characterization maps, which may have been re-characterized. Method 400 proceeds to exit.

Thus, operation of fuel injectors may be re-characterized in fuel injector characterization maps to compensate for fuel injector wear and part-to-part variability without having to operate the engine at speeds and loads corresponding to entries in the fuel injector characterization maps. In addition, engine emissions may be reduced when re-characterizing fuel injectors and vehicle drivability may not have to be compromised since fuel is injected and oxidized within a catalyst when driver demand torque is zero.

Turning now to FIG. 5, an example routine 500 is shown for correlating a pressure drop at a fuel rail with fuel injector performance. Specifically, pressure drops in the pressure rail of the fuel injector injecting fuel to the deactivated cylinder are compared to an expected drop to evaluate whether a fuel injector is injecting a desired (or commanded) amount of fuel.

At 502, the fuel rail pressure (FRP) drop in the fuel rail may be measured after each injection. It will be appreciated that in alternate examples, the change in fuel rail pressure at the high pressure or low pressure fuel rail may be estimated after a defined number of injection pulses, such as every 2 or 3 pulses. As such, the number may be dependent on the pulse width (or the commanded fuel volume injection amount) of each fuel injection pulse. Thus, if the pulse width is higher, the change in FRP may be estimated more frequently (after a fewer number of injection pulses) while if the pulse width is lower, the change in FRP mat be estimated less frequently (after a larger number of injection pulses). Since all fuel pumping is suspended during the characterization, the amount of fuel, and thus the FRP, decreases with each injection from the fuel injector. FIG. 6A shows an example fuel injector re-characterization process in which one fuel injector coupled to a single cylinder is opened in a predetermined sequence while the remaining cylinders do not receive fuel via their fuel injectors. FIG. 6B depicts subsequent pressure drops in a fuel rail.

Sequence 600 of FIG. 6A shows fuel injection timing plotted on the vertical axis and cylinder number plotted on the horizontal axis. The example depicted is for a 4-cylinder engine where each cylinder includes a direct injector and a port injector. The top plot 602 represents a firing sequence for direct injectors and each portion of fuel injection via a direct injector is depicted by a dotted block. The bottom plot 604 of FIG. 6A represents a firing sequence for port injectors and each portion of port injected fuel is shown as a diagonally striped block. Line 603 represents the beginning of a port injector re-characterization sequence for cylinder number one corresponding to time t1 of map 610. Line 605 represents a timing corresponding to t2 of sequence 610. Sequence 610 of FIG. 6B shows fuel rail pressure (FRP) plotted on the vertical axis against time on the horizontal axis. Plot 612 illustrates the change in FRP within a low pressure fuel rail as a port injector opens to supply fuel cylinder number one during re-characterization of the port fuel injector for cylinder number one.

Prior to t1, denoted on FIG. 6A by line 603, during normal engine operation, each cylinder may be fueled via both injectors and fuel pressure in both rails may be maintained at initial operating pressures. At line 603, based on entry into deceleration fuel shut-off and other engine operating conditions being met, a port injector re-characterization sequence may commence for the port injector that delivers fuel to cylinder number one. During the re-characterization event, cylinder number one may exclusively receive port injected fuel while cylinders two, three, and four receive no fuel.

As shown in map 610 of FIG. 6B, fuel rail pressure may be increased to a threshold level in the low pressure fuel rail prior to the start of the re-characterization event. Pressure in the low pressure fuel rail coupled to port injectors may be increased from an initial level of PI_Pi to an upper threshold level of PI_Po. Similarly, pressure in the high pressure fuel rail coupled to direct injectors may be increased for re-characterizing direct fuel injectors. After both rails are pressurized to their respective upper thresholds, all fuel pumping is suspended until the re-characterization event for the fuel injectors is completed or disabled.

After each injection, pressure in each of the fuel rails may experience a drop as shown in FIG. 6B. Port injector performance may be evaluated by correlating a pressure drop after each injection to an expected drop. For example, at time t2, drop in FRP after an injection via the port injector (represented at line 605 on sequence 600) may be calculated as the difference between P1, the pressure before the injection event, and P2, the pressure immediately after that injection event. An average of multiple pressure readings prior to and after an injection event may be obtained for higher precision while calculating the pressure drops.

Returning again to routine 500, after a FRP drop is determined at each injection, each pressure drop may be compared to an expected pressure drop at 504. If the measured pressure drop is comparable to an expected drop, at 506 the routine may retain the present fuel injector characterization and the routine may end. On the other hand, if it is established that the observed pressure drop is different from the expected drop, method 500 proceeds to 508.

It should be noted that during DFSO, fuel injection pressure may slowly rise due to increasing fuel rail temperature. The expected fuel pressure drop may be compensated for the slow pressure rise. In one example, the fuel pressure drop while the fuel injector is energized is only fuel pressure drop compared to an expected value so that the fuel injector pressure drop may dominate over the pressure increase due to the fuel rail.

At 508, an adjustment for the port injector may be learned. For example, if it was determined that the port injector over-injected fuel, the controller may learn a difference between the expected amount of port fuel injection and the actual amount of port injection based on the change in fuel rail pressure. During subsequent fuel injection, the pulse width and duty cycle of the port injector may be adjusted based on the learned difference to compensate for the over-fueling. For example, the fuel injection pulse width may be reduced in the fuel injector characterization map as a function of the learned difference. In an alternate example, if it was determined that the port injector under-injected fuel, the controller may learn a difference between the expected amount of port fuel injection and the actual amount of port injection based on the change in fuel rail pressure. During subsequent fuel injection, the pulse width of the port injector may be adjusted in the fuel injector characterization map based on the learned difference to compensate for the under-fueling. For example, the fuel injection pulse width may be increased in the fuel injector characterization map as a function of the learned difference. Subsequent operation of the fuel injector is based on the re-characterized fuel injector map for the fuel injector. Method 500 proceeds to exit.

Routine 500 may be performed after each injection by the port injector being re-characterized or after each direct injection to generate sufficient readings enabling a more accurate diagnosis of injector performance. The number of injections that can occur during a re-characterization event may further depend on the FRP drop within the high pressure fuel rail. Fueling via the re-characterized injector may be adjusted at the end of a re-characterization event based on the diagnosis. Direct fuel injectors may be re-characterized in a similar way.

Referring now to FIG. 7, a prophetic fuel injector re-characterization sequence according to the method of FIGS. 3-5 is shown. The sequence of FIG. 7 may be performed via the system of FIGS. 1 and 2. The vertical lines between times t10 and t18 represent times of interest in the fuel injector re-characterization sequence. In this example, only port fuel injectors are re-characterized, but direct fuel injectors may be re-characterized in a similar way. The sequence is illustrative of operating a four cylinder engine according to the method of FIGS. 3-5.

The first plot from the top of FIG. 7 is a plot of fuel rail pressure for a fuel rail supplying fuel to the fuel injector that is being re-characterized versus time. The vertical axis represents fuel pressure and fuel pressure increases in the direction of the vertical axis arrow. The horizontal axis represents time and time increases from the left side of the figure to the right side of the figure.

The second plot from the top of FIG. 7 is a plot of driver demand torque (e.g., torque requested by a human or autonomous vehicle driver that may be based on accelerator pedal position and vehicle speed) versus time. The vertical axis represents driver demand torque and driver demand torque increases in the direction of the vertical axis arrow. The horizontal axis represents time and time increases from the left side of the figure to the right side of the figure.

The third plot from the top of FIG. 7 is a plot of vehicle deceleration fuel shut-off state versus time. The vehicle is in deceleration fuel shut-off mode when the trace is at a higher level near the vertical axis arrow. The vehicle is not in deceleration fuel shut-off mode when the trace is at a lower level near the horizontal axis. The vertical axis represents deceleration fuel shut-off state. The horizontal axis represents time and time increases from the left side of the figure to the right side of the figure.

The fourth plot from the top of FIG. 7 is a plot of an amount of oxygen stored in a catalyst positioned in an exhaust system downstream of an engine. The vertical axis represents amount of oxygen stored in a catalyst and amount of oxygen stored in a catalyst increases in the direction of the vertical axis arrow. The horizontal axis represents time and time increases from the left side of the figure to the right side of the figure. Horizontal line 702 is a desired amount of oxygen stored in the catalyst upper threshold (e.g., 75 percent of the catalyst's oxygen storage capacity). Horizontal line 704 is a desired amount of oxygen stored in the catalyst lower threshold (e.g., 25 percent of catalyst's oxygen storage capacity). Thus, the desired amount of oxygen in the catalyst is between upper limit 702 and lower limit 704. By maintaining the amount of oxygen within this range, catalyst efficiency may be maintained.

The fifth plot from the top of FIG. 7 is a plot of fuel amount injected to the engine versus time. The vertical axis represents amount of fuel injected to the engine and the amount of fuel injected to the engine increases in the direction of the vertical axis arrow. The horizontal axis represents time and time increases from the left side of the figure to the right side of the figure. Also, below the horizontal axis, numbers are used to indicate injectors of which cylinders are injecting fuel. For example, between time t10 and time t11, injectors 1-4 supply the fuel amount to the engine. Between time t13 and time t14, fuel is delivered to the engine via only the fuel injector of cylinder number three.

The sixth plot from the top of FIG. 7 is a plot of fuel injector characterization status versus time. The fuel injectors are being re-characterized when the trace is at a higher level near the vertical axis arrow. The fuel injectors are not being re-characterized when the trace is at a lower level near the horizontal axis. The vertical axis represents fuel injector re-characterization status. The horizontal axis represents time and time increases from the left side of the figure to the right side of the figure.

The seventh plot from the top of FIG. 7 is a plot of catalyst balancing fuel injection amount versus time. The vertical axis catalyst balancing fuel injection amount and catalyst balancing fuel injection amount increases in the direction of the vertical axis arrow. The horizontal axis represents time and time increases from the left side of the figure to the right side of the figure. The catalyst balancing fuel injection amount is an amount of fuel that is injected to the engine for the specific purpose of reducing oxygen in the catalyst after a deceleration fuel shut-off event so that NOx conversion efficiency of the catalyst may be improved. The catalyst balancing fuel injection amount is added to the amount of fuel supplied to the engine based on engine speed and load. Thus, if X grams of fuel is injected to the engine to provide a stoichiometric air fuel ratio when operating the engine at a particular engine speed and load, Y grams of fuel may be added to the X grams of fuel during an engine cycle to rebalance the catalyst for improving tailpipe emissions.

At time t10, driver demand torque is at a middle level and fuel injector re-characterization is not active. The fuel rail pressure is at a middle level and it is based on engine speed and load. The engine is not in deceleration fuel shut-off mode and the oxygen stored in the catalyst is between level 702 and level 704. Additional fuel is not injected to the engine for catalyst balancing of oxygen in the catalyst.

At time t11, the driver demand decreases in response to the driver releasing the accelerator pedal (not shown). Shortly thereafter, the vehicle enters deceleration fuel shut-off mode where fuel flow to engine cylinders ceases. Further, spark delivery to engine cylinders ceases. The engine continues to rotate (not shown).

Between time t11 and time t12, pressure in the fuel rail is increased and the fuel injector characterization status indicates that the process of re-characterizing a fuel injector has begun. The fuel injector being re-characterized is the fuel injector for cylinder number three. However, fuel is not injected to cylinder number three because the entry in the fuel injector characterization map being evaluated corresponds to a fuel injection amount that would reduce oxygen stored in the catalyst to a level less than 704. Therefore, injecting fuel to cylinder number three is delayed so that oxygen stored in the catalyst may be increased. During deceleration fuel shut-off, air may be pumped through the engine even though the throttle is closed so that the amount of oxygen stored in the catalyst may increase until the catalyst is saturated with oxygen or the vehicle exits deceleration fuel shut-off. In some examples, throttle position may be adjusted to increase or decrease air flow to the catalyst so that fuel may be injected sooner or later depending on objectives. Oxygen stored in the catalyst increases and the vehicle is in deceleration fuel shut-off mode. The driver demand torque remains zero and fuel is not injected to balance the catalyst.

At time t12, the driver demand torque increases and the vehicle exits deceleration fuel shut-off mode in response to the increased driver demand torque. Fuel injector re-characterization ceases as indicated by the fuel injector characterization status and oxygen stored in the catalyst begins to decrease. Shortly after time t12, additional fuel is injected to the engine to rebalance oxygen in the catalyst to a lower level to improve catalyst NOx conversion efficiency. Because the amount of oxygen stored in the catalyst is less than threshold 702, the fuel injected to balance the catalyst is rather small.

Between time t12 and time t13, the driver demand torque increases responsive to driver input. The fuel rail pressure is at a middle level and the vehicle does not enter deceleration fuel shut-off mode. The amount of oxygen stored in the catalyst continues to decrease and fuel is injected to all four engine cylinders. Fuel injector re-characterization does not occur and additional fuel is not injected to rebalance oxygen in the catalyst, except near time t12 as previously described.

At time t13, the driver demand decreases in response to the driver releasing the accelerator pedal (not shown). Shortly thereafter, the vehicle enters deceleration fuel shut-off mode where fuel flow to engine cylinders ceases. Further, spark delivery to engine cylinders ceases. The engine continues to rotate (not shown).

Between time t13 and time t14, pressure in the fuel rail is increased and then it decreases twice in response to two fuel injections. The fuel injector characterization status indicates that the process of re-characterizing a fuel injector has begun. The fuel injector being re-characterized is the fuel injector for cylinder number three and fuel injector number three injects fuel twice. Fuel is injected each time after oxygen stored in the catalyst reaches a level where the stored oxygen may oxidize the injected fuel while maintaining the oxygen above threshold 704, the fuel injected from the fuel injector for cylinder number three is based on a quantity of fuel in the fuel injector map being re-characterized. Oxygen stored in the catalyst decreases after the fuel is injected to cylinder number three and the vehicle remains in deceleration fuel shut-off mode. The driver demand torque remains zero and fuel is not injected to balance the catalyst.

At time t14, the driver demand torque increases and the vehicle exits deceleration fuel shut-off mode in response to the increased driver demand torque. Fuel injector re-characterization ceases as indicated by the fuel injector characterization status and oxygen stored in the catalyst begins to increase. Shortly after time t14, additional fuel is not injected to the engine to rebalance oxygen in the catalyst since the amount of oxygen stored in the catalyst is already near lower threshold 704. By allowing the oxygen to increase, hydrocarbon oxidation may be improved.

Between time t14 and time t15, the driver demand torque increases responsive to driver input. The fuel rail pressure is at a middle level and the vehicle does not enter deceleration fuel shut-off mode. The amount of oxygen stored in the catalyst continues to increase and fuel is injected to all four engine cylinders. Fuel injector re-characterization does not occur and additional fuel is not injected to rebalance oxygen in the catalyst.

At time t15, the driver demand again decreases in response to the driver releasing the accelerator pedal (not shown). Shortly thereafter, the vehicle enters deceleration fuel shut-off mode where fuel flow to engine cylinders ceases. Further, spark delivery to engine cylinders ceases. The engine continues to rotate (not shown).

Between time t15 and time t16, pressure in the fuel rail is increased and then it decreases four times in response to four fuel injections into cylinder number three. The fuel injector characterization status indicates that the process of re-characterizing a fuel injector has begun. The first two fuel injections into cylinder number three inject larger amounts of fuel into cylinder number three. The second two fuel injections into cylinder number three inject smaller amounts of fuel into cylinder number three. As such, the amount of oxygen stored in the catalyst before the first two fuel injections into cylinder number three injections are permitted is larger than the amount of oxygen stored in the catalyst before the second two fuel injections is permitted so that oxygen in the catalyst remains between upper threshold 702 and lower threshold 704. The first two fuel injections are the basis for adjusting one entry in a fuel injector characterization map for the fuel injector supplying fuel to cylinder number three and the second two fuel injectors are the basis for adjusting a second entry in the fuel injector characterization map for the fuel injector supplying fuel to cylinder number three.

Later, re-characterization of the fuel injector supplying fuel to cylinder number four begins and fuel pressure is increased before fuel is injected to cylinder number four. Fuel is injected to cylinder number four when the oxygen in the catalyst reaches threshold 702. However, before re-characterization of the fuel injector for cylinder number four is complete, the vehicle exits deceleration fuel shut off at time t16. The driver demand torque remains zero and fuel is not injected to balance the catalyst.

At time t16, the driver demand torque increases and the vehicle exits deceleration fuel shut-off mode in response to the increased driver demand torque. Fuel injector re-characterization ceases as indicated by the fuel injector characterization status and oxygen stored in the catalyst begins to increase. Shortly after time t14, additional fuel is not injected to the engine to rebalance oxygen in the catalyst since the amount of oxygen stored in the catalyst is already near lower threshold 704. By allowing the oxygen to increase, hydrocarbon oxidation may be improved.

Between time t16 and time t17, the driver demand torque increases responsive to driver input. The fuel rail pressure is at a middle level and the vehicle does not enter deceleration fuel shut-off mode. The amount of oxygen stored in the catalyst remains near fifty percent of catalyst oxygen storage capacity (e.g., an actual total amount of oxygen the catalyst may store when catalyst temperature is greater than a threshold temperature) continues to increase and fuel is injected to all four engine cylinders. Fuel injector re-characterization does not occur and additional fuel is not injected to rebalance oxygen in the catalyst.

At time t17, the driver demand again decreases in response to the driver releasing the accelerator pedal (not shown). Shortly thereafter, the vehicle enters deceleration fuel shut-off mode where fuel flow to engine cylinders ceases. Further, spark delivery to engine cylinders ceases. The engine continues to rotate (not shown).

Between time t17 and time t18, pressure in the fuel rail is increased and then it decreases six times in response to six fuel injections into cylinder number four. The fuel injector characterization status indicates that the process of re-characterizing a fuel injector has begun. The first and second fuel injections into cylinder number four inject larger amounts of fuel into cylinder number four. The third and fourth fuel injections into cylinder number four inject smaller amounts of fuel into cylinder number four. The fifth and sixth fuel injections into cylinder number four inject yet smaller amounts of fuel into cylinder number four. Therefore, the amount of oxygen stored in the catalyst before the first and second fuel injections into cylinder number four injections are permitted is larger than the amount of oxygen stored in the catalyst before the third and fourth fuel injections are permitted so that oxygen in the catalyst remains between upper threshold 702 and lower threshold 704. The first and second fuel injections are the basis for adjusting one entry in a fuel injector characterization map for the fuel injector supplying fuel to cylinder number four and the third and fourth fuel injectors are the basis for adjusting a second entry in the fuel injector characterization map for the fuel injector supplying fuel to cylinder number four.

At time t18, the driver demand torque increases and the vehicle exits deceleration fuel shut-off mode in response to the increased driver demand torque. Fuel injector re-characterization ceases as indicated by the fuel injector characterization status. Shortly after time t18, additional fuel is injected to the engine to rebalance oxygen in the catalyst since the amount of oxygen stored in the catalyst is at higher threshold 702. By injecting the additional fuel, the catalyst may convert NOx more efficiently.

In this way, fuel injection into engine cylinders during deceleration fuel shut-off may be delayed until there is sufficient oxygen in the catalyst to maintain an amount of oxygen stored in the catalyst between an upper threshold and a lower threshold after the fuel is injected so that hydrocarbon conversion efficiency remains high. Further, by injecting fuel to deactivated cylinders, vehicle drivability may not be degraded when fuel injectors are being re-characterized.

Figure 8:
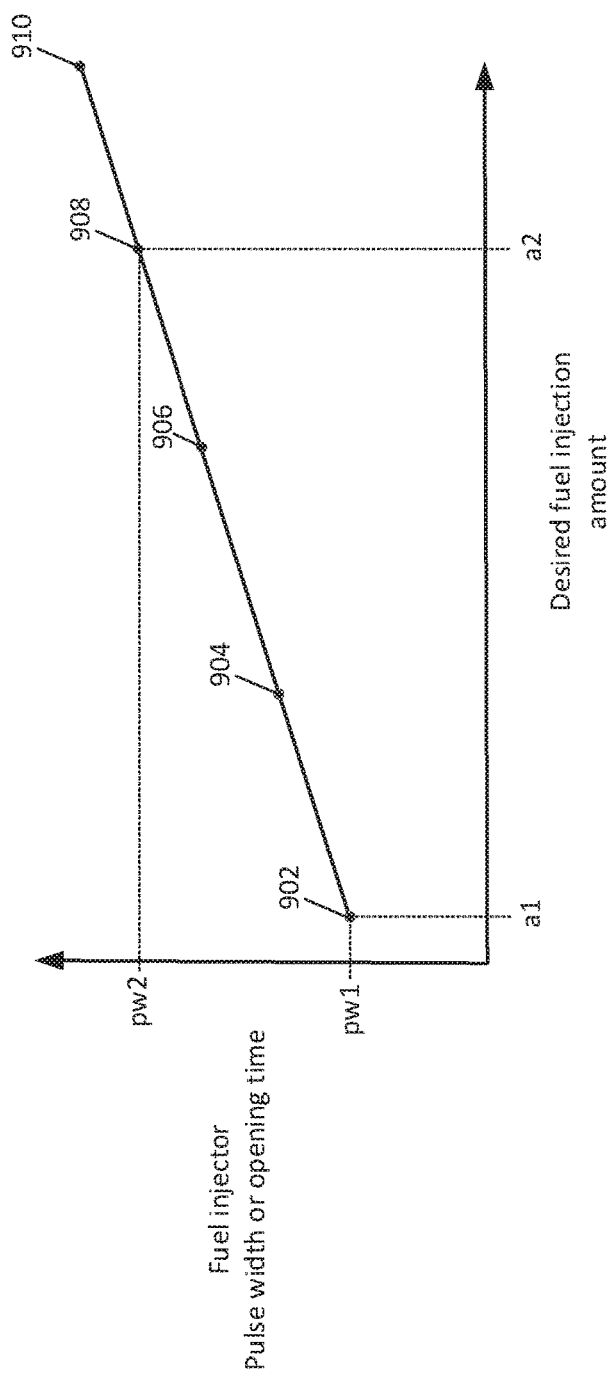
FIG. 8 shows an example fuel injector characterization map.

Referring now to FIG. 8, an example fuel injector characterization map is shown. In this example, the fuel injector characterization map includes five entries 902-910. However, a greater or less number of entries may be provided. The fuel injector characterization map includes a horizontal axis and a vertical axis. The vertical axis represents fuel injector pulse width or amount of time the fuel injector is open. The horizontal axis represents a desired amount of fuel to inject via the fuel injector. A fuel injector characterization map may be provided for each fuel injector.

The fuel injector characterization map is applied in the following way. If an amount of fuel desired to be injected is a1, the table outputs a value of pw1 by determining where a1 intersects at 902. On the other hand, if an amount of fuel desired to be injected is a2, the table outputs a value of pw2 by determining where a2 intersects at 908. Thus, a fuel injector pulse width is determined from the fuel injector characterization map by referencing or indexing the map using the desired fuel injection amount. Method 400 may adjust the values (e.g., the pulse widths) of entries 902-910 responsive to the pressure drop in the fuel rail observed during deceleration fuel shut-off.

The methods described herein provide for a method for operating an engine, comprising: increasing pressure of a fuel rail to a threshold pressure and deactivating a cylinder of the engine in response to entering deceleration fuel shut-off; deactivating a fuel pump in response to pressure in the fuel rail being at the threshold pressure; injecting fuel to the deactivated cylinder; correlating pressure drop in the fuel rail to injector operation; and operating a fuel injector responsive to the correlation. The method includes where the fuel injector is a port fuel injector or a direct fuel injector. The method further comprises closing a throttle of the engine and ceasing spark delivery to the cylinder. The method further comprises adjusting an amount of fuel injected to the deactivated cylinder responsive to an amount of oxygen stored in a catalyst. The method further comprises estimating air flow through the engine during deceleration fuel shut-off. The method further comprises estimating an amount of oxygen stored in a catalyst during deceleration fuel shut-off. The method further comprises increasing pressure in the fuel rail in response to exiting deceleration fuel shut-off.

The methods described herein also provide for a method for operating an engine, comprising: increasing pressure of a fuel rail to a threshold pressure and deactivating a cylinder of the engine in response to entering deceleration fuel shut-off; adjusting air flow through the engine during deceleration fuel shut-off responsive to an amount of oxygen stored in a catalyst; injecting fuel to the deactivated cylinder; correlating pressure drop in the fuel rail to fuel injector operation; and operating a fuel injector responsive to the correlation.

In some examples, the method further comprises adjusting the air flow responsive to a desired amount of fuel injected to the deactivated cylinder. The method further comprises ceasing spark delivery to the deactivated cylinder. The method further comprises estimating the amount of oxygen stored in the catalyst during deceleration fuel shut-off. The method includes where injecting fuel to the deactivated cylinder includes injecting fuel to the deactivated cylinder a predetermined number of times. The method further comprises deactivating a fuel pump in response to pressure in the fuel rail being at the threshold pressure. The method includes where the correlating includes indicating degradation of the fuel injector when a decrease in pressure in the fuel rail is higher than a threshold. The method includes where the correlating includes indicating degradation of the fuel injector when a decrease in pressure in the fuel rail is lower than a threshold. The method includes where air flow through the engine is adjusted via adjusting a position of a throttle.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, at least a portion of the described actions, operations and/or functions may graphically represent code to be programmed into non-transitory memory of the computer readable storage medium in the control system. The control actions may also transform the operating state of one or more sensors or actuators in the physical world when the described actions are carried out by executing the instructions in a system including the various engine hardware components in combination with one or more controllers.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A method for operating an engine, comprising:
increasing pressure of a fuel rail to a threshold pressure and deactivating a cylinder of the engine in response to entering deceleration fuel shut-off;
deactivating a fuel pump in response to pressure in the fuel rail being at the threshold pressure;
injecting fuel to the deactivated cylinder;
correlating pressure drop in the fuel rail to injector operation; and
operating a fuel injector responsive to the correlation.

2. The method of claim 1, where the fuel injector is a port fuel injector or a direct fuel injector.

3. The method of claim 1, further comprising closing a throttle of the engine and ceasing spark delivery to the cylinder.

4. The method of claim 1, further comprising adjusting an amount of fuel injected to the deactivated cylinder responsive to an amount of oxygen stored in a catalyst.

5. The method of claim 1, further comprising estimating air flow through the engine during deceleration fuel shut-off, and adjusting the air flow through the engine during deceleration fuel shut-off responsive to an amount of oxygen stored in a catalyst.

6. The method of claim 1, further comprising estimating an amount of oxygen stored in a catalyst during deceleration fuel shut-off.

7. The method of claim 1, further comprising increasing pressure in the fuel rail in response to exiting deceleration fuel shut-off.

8. A method for operating an engine, comprising:
increasing pressure of a fuel rail to a threshold pressure and deactivating a cylinder of the engine in response to entering deceleration fuel shut-off;
adjusting air flow through the engine during deceleration fuel shut-off responsive to an amount of oxygen stored in a catalyst;
injecting fuel to the deactivated cylinder;
correlating pressure drop in the fuel rail to fuel injector operation; and
operating a fuel injector responsive to the correlation.

9. The method of claim 8, further comprising adjusting the air flow responsive to a desired amount of fuel injected to the deactivated cylinder.

10. The method of claim 8, further comprising ceasing spark delivery to the deactivated cylinder.

11. The method of claim 8, further comprising estimating the amount of oxygen stored in the catalyst during deceleration fuel shut-off.

12. The method of claim 8, where injecting fuel to the deactivated cylinder includes injecting fuel to the deactivated cylinder a predetermined number of times.

13. The method of claim 8, further comprising deactivating a fuel pump in response to pressure in the fuel rail being at the threshold pressure.

14. The method of claim 8, where the correlating includes indicating degradation of the fuel injector when a decrease in pressure in the fuel rail is higher than a threshold.

15. The method of claim 8, where the correlating includes indicating degradation of the fuel injector when a decrease in pressure in the fuel rail is lower than a threshold.

16. The method of claim 8, where air flow through the engine is adjusted via adjusting a position of a throttle.

* * * * *